US006885975B2

(12) United States Patent
Srinivasan et al.

(10) Patent No.: US 6,885,975 B2
(45) Date of Patent: Apr. 26, 2005

(54) METHOD AND APPARATUS FOR MANAGING PROCESS TRANSITIONS

(76) Inventors: Rajagopalan Srinivasan, 105 Clementi Road, #06-06, Singapore 129789 (SG); Anandakrishnan Sundarraman, Plot No. 46, Door No. 4 Bhuvaneshwari Nagar 4th Street, Chromepet, Chennai 600044 (IN); Pradeep Kumar Viswanathan, #2, 'Anubav', 12 Valluvar Road Extension Jagannatha Nagar, Arumbakkan, Chennai 600106 (IN); Hiranmayee Vedam, 105 Clementi Road, #06-06, Singapore 129789 (SG); Nochur Ananthanarayanan, Blk 50, Sims Drive #18-144, Singapore 380050 (SG)

(*) Notice: Subject to any disclaimer, the term of this patent is extended or adjusted under 35 U.S.C. 154(b) by 193 days.

(21) Appl. No.: 10/008,552

(22) Filed: Nov. 13, 2001

(65) Prior Publication Data

US 2002/0173936 A1 Nov. 21, 2002

Related U.S. Application Data

(60) Provisional application No. 60/248,402, filed on Nov. 14, 2000.

(51) Int. Cl.[7] ............................................. G05B 13/02
(52) U.S. Cl. ......................................... 702/183; 702/185
(58) Field of Search ..................... 700/28–31; 702/183, 702/185

(56) References Cited

U.S. PATENT DOCUMENTS

| 4,678,622 | A | | 7/1987 | Rowe et al. |
| 5,023,045 | A | | 6/1991 | Watanabe et al. |
| 5,070,468 | A | | 12/1991 | Niinomi et al. |
| 5,099,436 | A | | 3/1992 | McCown et al. |
| 5,192,845 | A | * | 3/1993 | Kirmsse et al. ............. 219/110 |
| 5,392,320 | A | | 2/1995 | Chao |
| 5,511,004 | A | | 4/1996 | Dubost et al. |
| 5,633,800 | A | * | 5/1997 | Bankert et al. ............. 700/177 |
| 6,654,649 | B1 | * | 11/2003 | Treiber et al. ................ 700/31 |
| 6,721,610 | B1 | * | 4/2004 | Gade et al. ................... 700/52 |
| 2002/0128731 | A1 | * | 9/2002 | Wegerich et al. ............. 700/31 |
| 2003/0040814 | A1 | * | 2/2003 | Moebius et al. ............. 700/42 |

OTHER PUBLICATIONS

Hwang, D.H. et al. "Real–time Monitoring For a Process With Multiple Operating Modes", Control Engineering Practice 7, 891–901, 1999.

(Continued)

*Primary Examiner*—Marc S. Hoff
*Assistant Examiner*—Craig Steven Miller
(74) *Attorney, Agent, or Firm*—Pandiscio & Pandiscio

(57) ABSTRACT

Operators and plant computer programs used to operate a complex process facility are aided in managing the process during transitions by a computer-based apparatus. The apparatus incorporates a knowledge base and methods for identifying modes and transitions during plant operation. At frequent intervals, measured values of the process variables are used to evaluate the current state of the process and its sections and subsections. The identified state of the plant is broadcast to different clients of this application. The apparatus monitors the plant for the normal execution of the transition. It also identifies the current task being performed in the process and sends this message to different sections of the plant. The results are displayed on a visual display device and can also be sent to other plant computer programs for guidance during the transition. A permanent chronological record of the sequence of events—modes and transitions—of the plant and sections and subsections including the pertinent plant conditions and information is also generated by the apparatus for subsequent review and analysis. Methods for generating the knowledge base are also presented.

31 Claims, 9 Drawing Sheets

OTHER PUBLICATIONS

Iri, M. et al., "An Algorithm For Diagnosis of System Failures In The Chemical Process", Computers and Chemical Engineering, 3, 489–493, 1979.

Rengaswamy, R., "A Syntactic Pattern–recognition Approach for Process Monitoring and Fault Diagnosis", Engineering Applications of Artificial Intelligence, 8(1), 35–51, 1995.

Vedam, H. et al., "A Wavelet Theory Based Adaptive Trend Analysis System For Process Fault Diagnosis", Proceedings Of The Amerian Control Conference, 309–313, 1997.

Viswanathan, S. et al., "Automating Operating Procedure Synthesis for Batch Processes: Part I. Knowledge Representation and Planning Framework", Computers and Chemical Engineering, 22(11), 1673–1685, 1998.

* cited by examiner

METHOD AND APPARATUS FOR MANAGING PROCESS TRANSITIONS

REFERENCE TO PENDING PRIOR PATENT APPLICATION

This patent application claims benefit of pending prior U.S. Provisional Patent Application Ser. No. 60/248,402, filed Nov. 14, 2000 by Rajagopalan Srinivasan et al. for METHODS AND APPARATUS FOR MANAGING PROCESS TRANSITIONS, which patent application is hereby incorporated herein by reference.

FIELD OF THE INVENTION

This invention is directed to a method and apparatus for aiding operators and computer programs in managing process transitions during the operation of a complex process facility such as a chemical process plant, nuclear power plant, and semiconductor manufacturing facility. Examples of transitions that commonly occur in plants include, but are not restricted to, startup or shutdown of the plant, startup or shutdown of a unit in the plant, switching of a unit from a normal operation state to a different state for the purpose of maintenance or regeneration, variations made in the operating conditions to accommodate feed grade changes in a plant, variations made in the operating conditions to accommodate product slate changes in a plant, etc. Examples of computer programs that would be aided by the apparatus in this invention include, but are not restricted to, regulatory and supervisory controllers, alarm generation and management systems, advanced control systems, fault diagnosis systems, etc. Also this invention describes a method and system for monitoring processes during transitions, which identifies abnormalities and informs the plant operator regarding the same. Since none of the existing monitoring techniques can be used for monitoring transitions and since the probability of fault is higher during transitions than at steady state, such a system would be of immense help to operators.

BACKGROUND OF THE INVENTION

The operation of a complex process facility requires the assimilation of a large amount of data generated frequently from sensors, inferring the state of the process from these data and executing regulatory and supervisory actions to ensure safety and efficiency. While much of the operation of the modern complex process facility is automatically controlled, the execution of the process during transitions requires extensive human intervention and supervision. These operator interventions during transitions include starting or stopping process units such as pumps and compressors, disabling or enabling controllers, and reconfiguring units and controllers with different parameter settings. Transitions result in substantial changes in the values of one or more process variables. During transitions, some of these plant variables may therefore take values substantially different and outside their normal, steady state range. Because of the large changes and the unusual values of the process variables, plant computer programs that are configured for only one operating condition generate incorrect results. One example of this is the alarm system that would generate spurious alarms if it were not specifically configured for the transition. Other such computer programs include those for advanced control, unit optimization, etc. Operators therefore disable and/or ignore the results of such plant computer programs during transitions. The operator actions, mentioned above, that bring about a transition have to be performed at a specified time dependent on the status and conditions of the plant. Failure in this can lead to abnormal situations.

D. H. Hwang and C. Han, "Real-time Monitoring For A Process With Multiple Operating Modes", Control Engineering Practice, 7, 891–901, 1999, proposed a statistical method for monitoring processes with multiple operating modes. Their technique is applicable only for operation modes a that share common characteristics and do not introduce a significant amount of nonlinearities in the process behavior. Many common transitions such as a cold startup of a reactor or distillation column, decoking of a furnace, swinging of units for product or feed grade changes, and others result in significant nonlinear changes and cannot be monitored by their approach.

Process transitions are typically carried out by operators by following a standard operating procedure. A few techniques exist for monitoring the execution of the operating procedures in a process plant.

A method suggested in U.S. Pat. No. 5,511,004, issued April, 1996 to Dubost et al., establishes a reference state and a current state for an industrial evolutionary process from physical parameters measured on all the equipment items employing the evaluating process. These two states are compared, parameter by parameter, by resorting to fuzzy logic for classifying the quantities, and a diagnosis is established using expert rules.

U.S. Pat. No. 5,070,468, issued December, 1991 to Niinomi et al., presents a fault diagnosis system. The normal range of process data is stored in the system and is employed for online comparison to determine if the process is normal or not. Patterns exhibited by the process variables for different fault patterns are detected and recorded in the system. When a fault is identified, the pattern is compared with this stored database and the fault is diagnosed.

U.S. Pat. No. 5,392,320, issued February, 1995 to Chao et al., provides a monitoring system for a core of the nuclear reactor. Some process variables that need to be continuously monitored are identified. A database is maintained for normal and abnormal operation. Comparison of online data is done with this database to identify the plant situation.

An approach to monitoring a transient is described in U.S. Pat. No. 4,678,622, issued July, 1987 to Rowe et al. This makes use of the known phenomenon that during the startup in a nuclear reactor, the neutron density increases. However, there could also be an increase in the neutron density due to some abnormality. A system is built to detect the abnormality. If the startup is done normally, the neutron density increases slowly, whereas if there is a fault, there is an exponential increase. This difference is used for identifying the fault during startup.

A method and apparatus for fault diagnosis is described in U.S. Pat. No. 5,099,436, issued March, 1992 to McCown et al. In this system, the online values of variables are continuously monitored. If there is any deviation from normal, it is mapped to any pre-trained event (fault). It also consists of a symptom-fault model that can determine the cause of the failure.

U.S. Pat. No. 5,023,045, issued June, 1991 to Watanabe et al., describes a neural network based technique for detecting malfunctions in plants. The neural network is trained with normal and different runs of data with malfunctions. So this system, when used with online run, can identify trained malfunctions. An application on a nuclear power station has been discussed. Since this application requires training, it can function only for known faults for which the network has been trained.

A few other techniques also exist for monitoring the operating procedures for nuclear and thermal power plants. However, all of these techniques employ raw sensor values in their analysis.

There exist some techniques in published literature which use signed directed graphs (see Iri, M., Aoki, K., O'Shima, E. and Matsuyama, H., "An Algorithm For Diagnosis Of System Failures In Chemical Processes", Computers and Chemical Engineering, 3, 489–493, 1979) and trends (see Rengaswamy, R. and Venkatasubramanian, V., "A Syntactic Pattern Recognition Approach For Process Monitoring And Fault Diagnosis", Engineering Applications Of Artificial Intelligence, 8(1), 35–51, 1995; Vedam, H. and Venkatasubramanian, V., "A Wavelet Theory Based Adaptive Trend Analysis System For Process Fault Diagnosis", Proceedings Of The American Control Conference, 309–313, 1997) for monitoring steady state processes. During process transitions, the process is in a dynamic state and variable profiles change significantly. For monitoring such process behavior, none of the existing techniques (such as neural networks, signed directed graph or trend-based methods) could be used.

First, consider a signed digraph based technique. During process transitions, since interactions between the different variables vary with process operating conditions and time, a general cause-effect relation between process variables could not be obtained. So signed digraph based techniques cannot be used for monitoring process transitions.

In the trend-based approaches, the evolution of a process variable is classified based on its shape into slowly increasing, drastically increasing, constant, etc., by calculating the second order derivatives of the process variables. These are termed as second-order trends. First order derivatives of process variables result in trends which are classified into increasing, decreasing and constant. These are termed as first-order trends. Neither the second-order nor the first-order trend-based approaches can be applied to monitor process transitions as described below. As an example, consider the transition "startup of a reactor" that is performed in three main phases: (1) charging of reactants at room temperature (30° C.) into the reactor, (2) ramping up the temperature from 30° C. to 75° C. over 1.5 hours, and (3) maintaining the temperature at 75° C. Each process variable could display different trends during different phases. The temperature sensor in the above example would display a constant trend in phase 1, an increasing trend in phase 2, and a constant trend again in phase 3. Existing trend-based approaches are designed for fault detection in steady state operation and map a fixed trend (such as increasing temperature) occurring at any time with a fixed process state (such as a runaway reaction). This can lead to wrong results when used to monitor process transitions. In the above example, while the increasing trend in temperature would be diagnosed correctly as due to a runaway reaction if the process is in phase 3, an increasing trend in the same temperature variable during phase 2 would be misdiagnosed as due to a runaway reaction. Due to this and other limitations discussed later, existing trend based techniques can not be applied for monitoring transitions.

SUMMARY OF THE INVENTION

It is an overall object of this invention to provide a method and apparatus for aiding operators and plant computer programs in managing a process when it undergoes transitions.

It is a more specific object of the invention to aid the operator of a complex process facility by providing a computer-based system and a method of operation which incorporate prior generated knowledge of the process operation along with on-line plant data, whereby to identify the current state of the plant and monitor the plant during transitions.

It is a further object of the invention to provide such a system and method of operation which simultaneously provide the operator and other plant computer programs with information concerning the current state of a process, section or subsection and other useful, context-sensitive facts such as bounds on the process variables and expected and observed trends of these variables, steps in the transition which have been completed earlier, and steps in the transition which should be executed next.

This apparatus enables some plant computer programs to be robust to operating mode changes and reconfigure themselves to operate effectively during different process transitions and across multiple plant operating modes.

It is an additional object of the invention to provide a system and method of operation, which generates a permanent record of appropriate system and process conditions at important moments of each transition including its start, its completion, when something is abnormal, the operator actions, their magnitude, timing and sequence, etc. This record can be queried to provide decision support for plant operations and other activities that would gain by the knowledge of the transitions. An example of decision support includes a list of transitions in the record similar to a fully or partially specified one, the process conditions during those, operator actions, etc.

It is an additional object of this invention to provide a system and method for tracking and monitoring processes during transitions. Transitions are typically carried out by operators by following a set of standard operating procedures. The main challenge in monitoring transitions is run-to-run deviations. A technique is presented here which can identify the current state of the operating plant during a transition and perform context sensitive monitoring. If any deviation from normal operation is observed, the system flags the abnormality to the operator for necessary recovery of the process.

Briefly, the present invention includes a new method and apparatus for developing a generic facility for the management of process transitions. The apparatus employs a method for offline characterization of process plant and generation of a comprehensive knowledge base, which is deployed for real time mode-transition identification. Once the current plant state is identified, other subscribing applications are notified regarding the same.

The apparatus also includes a method for monitoring transitions (startup, shutdown, grade changes, etc.) in complex processes. Since trends alone are not sufficient for monitoring transitions, we have developed a technique called enhanced trends that include the process variable magnitude and the trend duration along with trend. The algorithm described employs a preprocessing technique to obtain process trends in addition to the quantitative information from the plant. The dictionary of possible transitions for each plant section is generated offline from the plant history data and stored corresponding to each sensor. The algorithm cannot only point out the region in the plant where an abnormality has occurred, but can also further resolve it to the level of a sensor.

The apparatus also includes a method that allows for run-to-run variations during process transitions.

A dynamic feature synchronization algorithm is employed to synchronize profiles from different runs. After synchronization, comparison of the expected trend and observed trend is done by using a comparison algorithm. Since transitions are usually performed by following a set of operating procedures, this knowledge is also made available to the system using a Grafcet representation. If any fault is identified by the system, the details of the fault, as well as the current task in the operating procedure during which the fault is identified, is informed to the operator.

DETAILED DESCRIPTION OF THE PREFERRED EMBODIMENTS

The invention will now be described in the context of a chemical process plant, but it should be realized that it has application to a wide variety of complex process facilities such as, for example, pharmaceutical operations, semiconductor and microelectronics manufacturing, specialty chemicals, paper and pulp mills, power plants, etc.

Any chemical plant is instrumented with numerous sensors that monitor various plant variables such as temperatures, flow rates, pressures, etc. The signals generated by the sensors are fed to the plant distributed control system (DCS) that performs and coordinates regulatory control of some of the variables. These variable values are also displayed to operators through monitors in the control room. Some of these values are also used by other plant computer programs such as an alarm system, a unit optimization system, etc., which help the operator to run the process safely and efficiently. During large periods of time, the plant is typically operated near one or more steady state conditions. During such a steady state condition, most process variables will vary slightly due to noise and disturbances. These variations would be within a narrow range around the fixed steady state value. However, not infrequently, the plant (or one of its constituent sections or subsections) will undergo a transition aimed at moving it from one steady state to another. Transitions are normally executed by plant operators who follow previously defined procedures to start or stop process units, controllers and instrumentation, or to reconfigure them with different settings so that the plant settles down to a different steady state. Many plant computer programs are configured solely for steady state operations and do not function satisfactorily during such transitions. Operators therefore disable them, or ignore or override their results, during the transitions.

Figure 1:
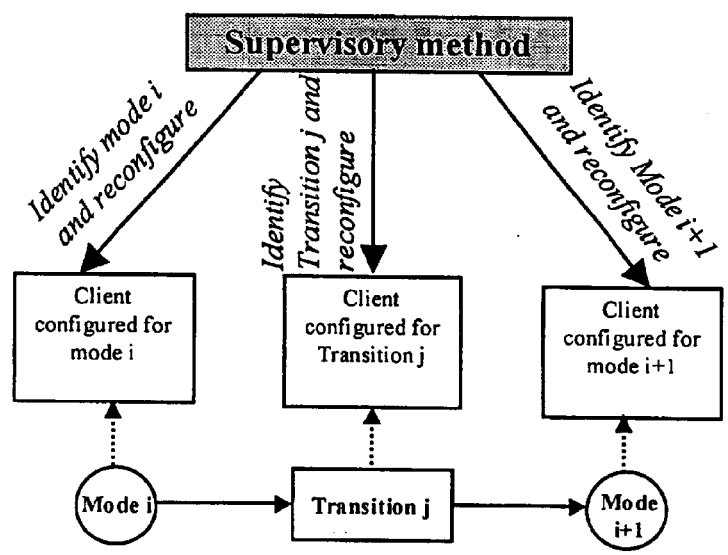
FIG. 1. is a schematic diagram of the overview of the invention.

All of what has been described so far is currently found in a typical chemical plant. The present invention provides a system that provides context-sensitive information and guidance to the operator during the transitions and automatically reconfigures other plant computer programs. Examples of automatic reconfiguration include the turning on/off of various computer programs, changing parameter settings, etc. An overview of this scheme is presented in FIG. 1. As shown in FIG. 1, the supervisory method identifies the current operating state of the plant. This information is provided to other clients such as alarm management systems, fault detection and diagnosis systems, etc., which configure themselves according the current plant state.

The purpose of the apparatus is fourfold:
1. to assess the current state of the process, including the current mode of the process, or the transition being executed;
2. to provide the process state and any necessary information to the plant operator and/or plant computer programs;
3. to monitor the process for the normal execution of a transition; and
4. to continuously track the execution of operating procedure during transition and inform the plant operator of the successful completion of the same.

First, there is a way for hierarchically decomposing the process and variables into a number of sections and subsections. When doing this, it is recommended that one use the process flow diagram (or at least a sketch of its physical arrangement) as well as the placement of the sensors. Each section can further be subdivided into one or more sections and/or subsections, and so on. Each subsection comprises of a set of one or more process variables whose values are measured periodically. A change in the value of any of these variables would indicate that the corresponding subsection is undergoing some change.

Figure 2:
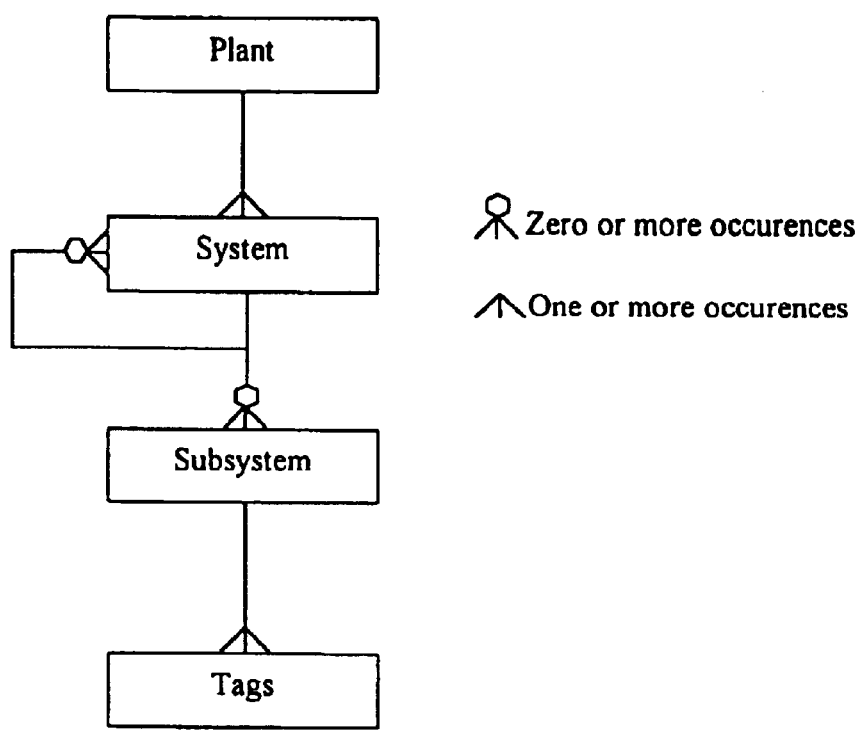
FIG. 2 is a schematic diagram of the method for hierarchically dividing the plant into sections and subsections.

A plant can be decomposed into one or more sections. For example, a refinery could be divided into a crude distillation unit, a vacuum distillation unit, a catalytic cracking unit, etc., that are called sections. This division is based on a number of factors including the functions and purpose of the major units, their interactions and interconnections, the extent of mutual dependence during their operations, their physical location, etc. Each section can be further divided such that it contains at least one sections or subsection. A subsection comprises of one or more sensors (also called variable tags) and performs a supporting function to its parent section. In the above example, the catalytic cracking unit section can be subdivided into a reactor-regenerator subsection, a feed preheater subsection, a main fractionator section, etc. The main fractionator section in turn is decomposed into an overhead subsection, a bottoms subsection and the column subsection. This hierarchical decomposition scheme is depicted in FIG. 2.

Figure 3:
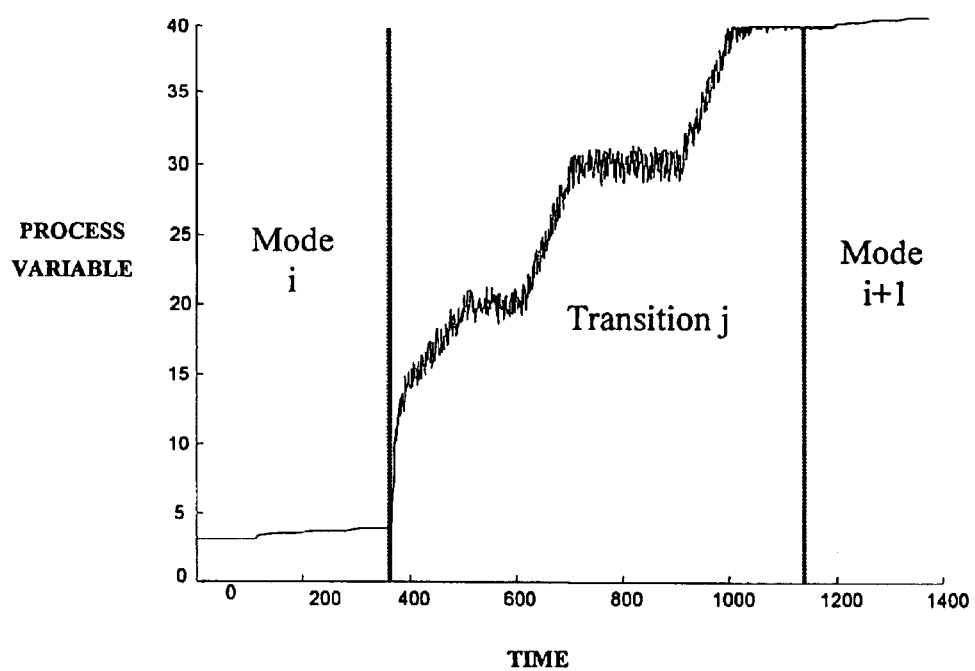
FIG. 3 shows how a process variable can be divided into periods of modes and transitions based on the changes in the variable value.

Next, there is a way of classifying the state of a subsection or section into modes and transitions as shown in FIG. 3. A subsection is said to be in a mode if, and only if, the values of all the variables with the subsection lie within a narrow range. The modes of subsections can be classified based on the nature of the changes in the process variables into a steady mode, oscillatory mode. A subsection is defined to be undergoing a transition if any of the variables with the subsection varies significantly. Transitions of subsections can be classified as sharp transitions, upset transitions, slow drift transitions, desired transitions, etc. A section is said to be in a mode if, and only if, all its subsections are all in modes. A section is said to be undergoing a transition if any of its immediate subsections are in a transition. Each subsection or section will, at any time, be in exactly one of several possible modes or transitions.

Next, a mode of a subsection can be characterized by specifying key descriptors such as an upper and lower bound for each process variable in the subgroup within which that variable would vary if the subgroup is in that mode. A non-empty subset (i.e., at least one) of process variables in a subsection would undergo significant changes when the subsection undergoes a transition. This subset of variables is called the set of key variables for that particular transition. A transition in a subsection is characterized by descriptors such as the subset of key variables along with distinct features in their variation as the transition is executed, the mode of the subsection immediately prior to the beginning of the transition, the mode of the subsection immediately after the completion of the transition, the start time of the transition and the end time of the transition, etc. The distinct features of the key variables include the sequence of trends, the duration for which each trend persists, variable values at the beginning and termination of each trend, the maximum and minimum values of the variables within the transition, etc.

As mentioned earlier, a section is said to be in a mode if each of its constituent subsections are themselves in a mode. The mode of a section is characterized by the values of the mode of its constituent sections and subsections. A section is said to be in a transition if even one of its constituent sections and subsections undergoes a transition. The transition of a section is characterized by the state (mode or transition) of each of its constituent sections and subsections, and this information may be recorded in a look up table. The section's characterization therefore includes this lookup table.

A self-contained knowledge base that contains all the information required for managing process transitions can be developed. The knowledge base of the apparatus comprises of the following constituents:

1. an hierarchical description of the process into sections and subsections as described above;
2. a list of modes and transitions for each of the process sections and subsections as described above;
3. the classification and characterization of each mode as described above; and
4. the classification and characterization of each transition as described above.

The above-described knowledge base can be completely developed using the aforementioned method for the plant's hierarchical decomposition, followed by including the list of modes and transitions, followed by characterizing each mode and transition. This knowledge base can be developed in one step or developed incrementally by following the same methods and appending new sections, subsections, modes and their characterization, transitions and their characterizations, etc.

The list of modes and transitions and their characterizations can be developed using the knowledge about the plant and its operation.

Alternatively, if historical data from the plant operation is available, the list of modes and transitions and their characterizations can be developed using the following method.

Figure 4:
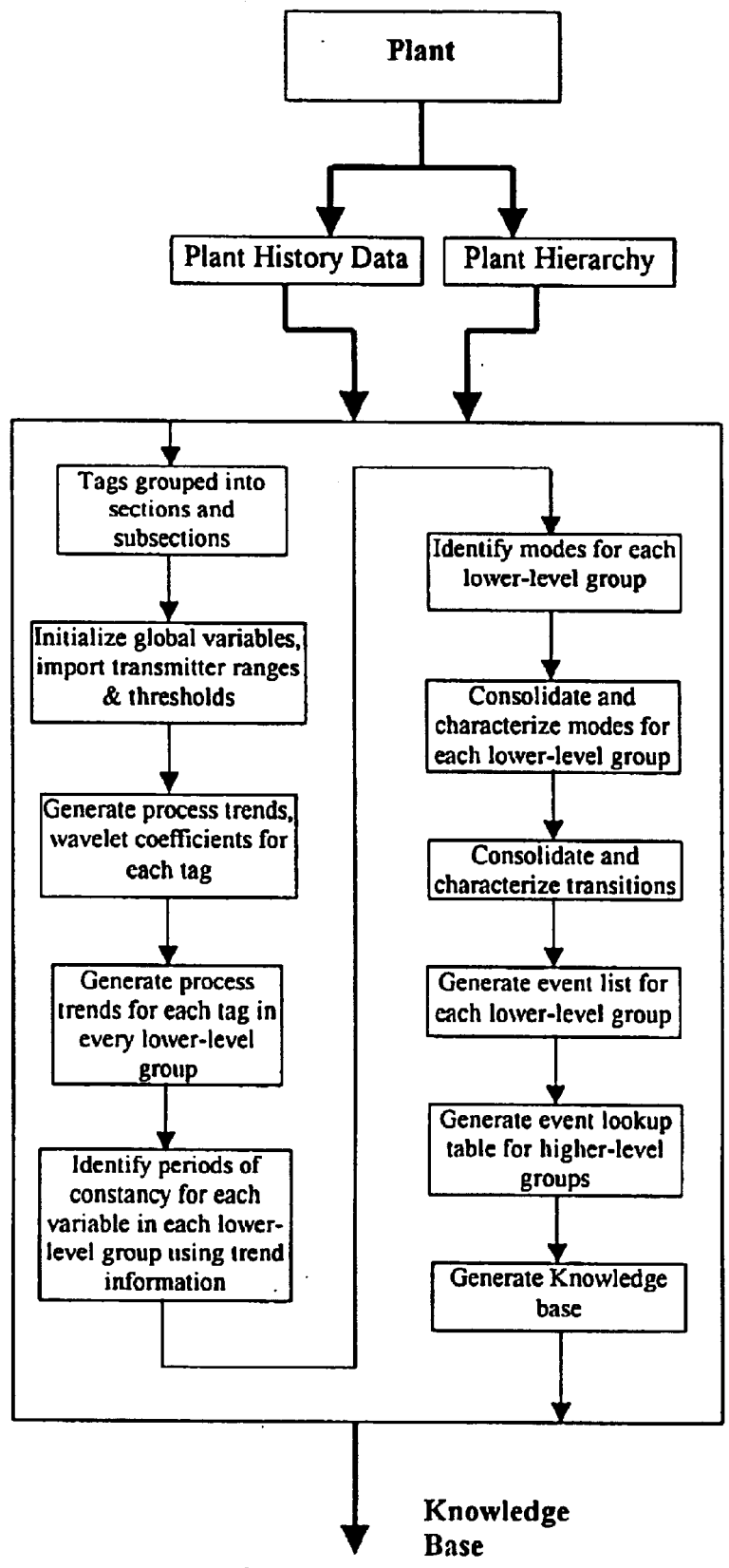
FIG. 4 shows the decision-making sequence followed by methods for identifying if a subsection is in a mode or transition.

There is a method for generating the list of modes and transitions for every subsection, section and plant if process historical data is available for every tag. This method is as shown in FIG. 4 and is based on dividing the plant historical data into regions of modes and transitions, using the prior developed description of the process hierarchical decomposition. This method also requires other selected process information including limits for each tag and pre-specified values for tuning parameters. The limits required include the maximum and the minimum value that can be reported by the transmitter for each tag, the transmitter range for each tag, etc. The pre-specified tuning parameters include a threshold for each tag. This threshold is defined to be the maximum allowable variation within a window for constancy and is typically selected to be a small percentage (~5%) of the transmitter range.

Once plant tags have been hierarchically grouped into sections as described above, they can be used for identifying subsection modes and transitions. Plant historical data corresponding to the tags is used in the analysis. Trends can be generated for each tag using any method including, but not restricted to, the wavelet-based trend generation algorithm reported by Vedam, H. and Venkatasubramanian, V., "A Wavelet Theory Based Adaptive Trend Analysis System For Process Fault Diagnosis", Proceedings Of The American Control Conference, 309–313, 1997. Wavelet approximation coefficients at multiple levels are also generated for each tag. A multitude of other wavelets including the Haar wavelet can be employed for this purpose. Portions of the historical data for which the variable shows a constant trend are identified using the trend information generated earlier. These portions are marked as modes for that tag. The mode information generated for all the tags in the subsection is matched to obtain the portions where all of the variables in the subsection remain nearly constant. These portions are identified as the modes for that subsection. Modes are characterized by the maximum and minimum values of each tag within the portion. The mode information for the subsection generated above is then analyzed for duplicate modes. Two modes of a section, $M_1$ and $M_2$, are considered to be the same if their characterizations are essentially similar. A multitude of similarity metrics can be used to compare the characterization of two modes. In one such metric, two modes of a subsection, $M_1$ and $M_2$, are said to be the same if the shortest distance between the maximum (or minimum) value of a tag during $M_1$ is no further from the minimum (or maximum) value of the tag during $M_2$ than a small pre-specified threshold. A typical value for this threshold is 5% of the tag's transmitter range. The similarity measure described above can be replaced with other similarity metrics. If consecutive duplicate modes are encountered, they are merged together to produce a single mode. The modes are also checked for their duration, and modes shorter than a pre-specified duration are eliminated by merging these portions along with the transition. After the modes have been identified as described above, the remaining portions of the historical data that have not been marked as modes are now marked as transitions. Key variables are then identified for each transition as described above. Transitions are then characterized using the distinct features in the key variables including the sequence of trends, the duration for which each trend persists, variable values at the beginning and termination of each trend, maximum and minimum values of the variable within the transition, etc., as described earlier.

The modes and transition characterizations generated above are used to create an event list consisting of all the events—mode or transition—for a subsection. The events for sections and plants are inferred from the events of the subsections of which it is comprised. An event look-up table is generated for each section and comprises each of the different combinations of events of subsections and the corresponding event for the section. The entire event look-up table, or any selected consistent subset such as those combinations of subsection events that were observed in historical data, can be used. Using the above described method, the list of modes and transitions and the characterizations for each mode and transition can be generated from process history data.

Next, there is a method for identifying the current process state. The apparatus implements a method for identifying the current state of the process and each section and subsection and it uses the knowledge base generated from the historical data.

Figure 5:
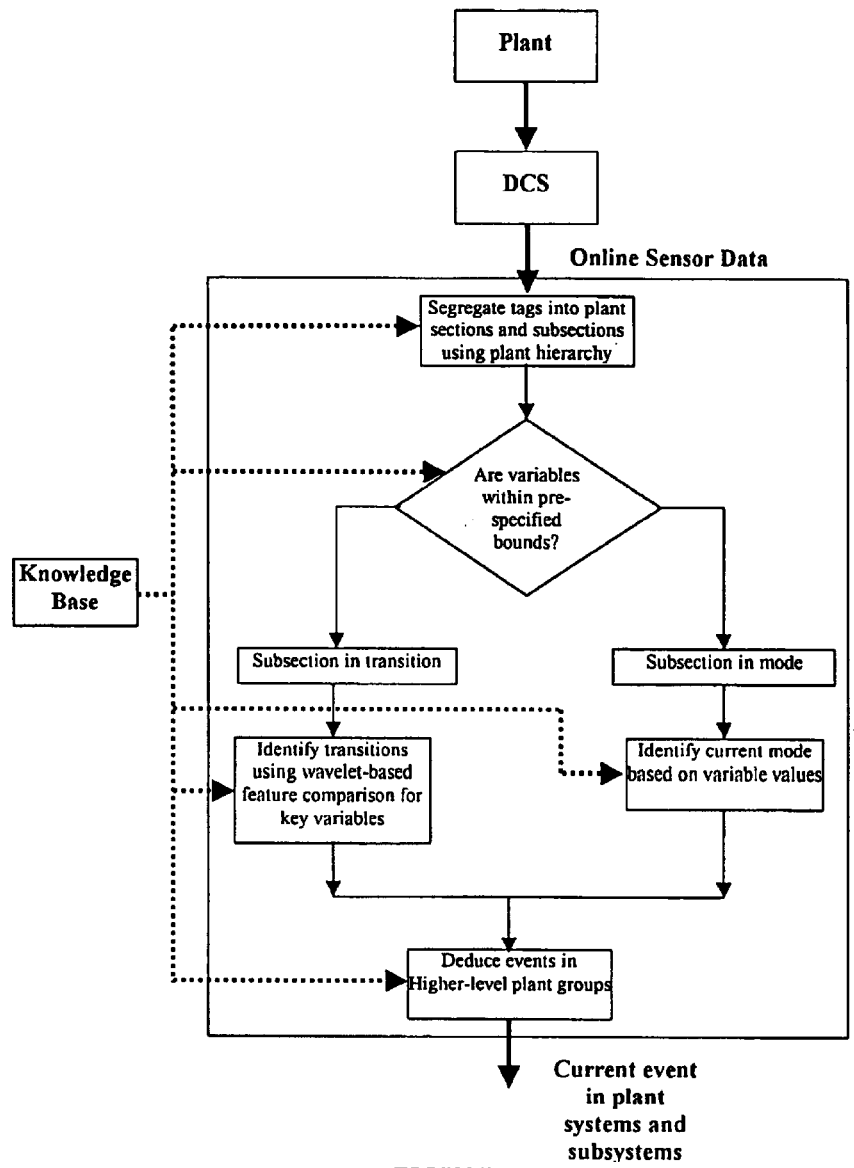
FIG. 5 shows the process knowledge base generation technique.

The steps in on-line identification of the state of the process are shown in FIG. 5. The method takes as input:

1. the knowledge base previously generated for the process;
2. the current values of process variables; and
3. values for tuning parameters selected by user.

The knowledge base generated offline is imported for use by the method to identify the current process state. Initialization calculations are performed and user-supplied tuning constants are assigned. The sensor data for all the plant tags sent from the DCS is separated based on the basis of plant groupings. For each subsection, the current sensor data is compared with the knowledge base of the modes possible for that group. If the value of each variable belonging to the subsection falls within the upper and lower limits for a given mode, the subsection is identified to be in that mode. To avoid false signals of a mode, the method waits for a certain minimum duration for which the subsection remains in the given mode before the current mode information is signaled. A user-defined parameter is employed to determine this minimum duration and could take any positive integer value. This procedure is repeated for all the subsections. If the subsection is not identified to be in any of the modes from the knowledge base, but all variables in that subsection are varying within user defined narrow bounds, then the subsection is said to be in an unknown mode. If even one of the variables in the subsection is varying beyond its bounds, the subsection is said to be in a transition.

Figure 6:
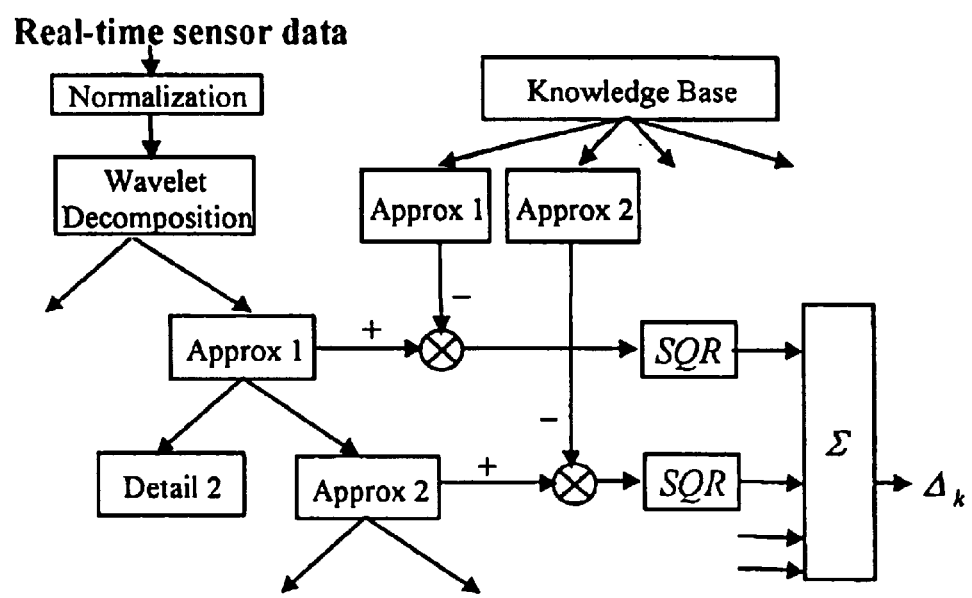
FIG. 6 shows a schematic of the method for transition identification.

The current transition is identified using the procedure described in FIG. 6. This procedure compares the currently evolving transition with the transitions existing in the imported knowledge base. The current transition can be identified using a similarity metric to compare its characterization with the characterizations of the transitions in the knowledge base. A multitude of similarity metrics can be used to compare the characterization of the current transition with that of a transition in the knowledge base. In one such metric, wavelet decomposition of the plant sensor is carried out for each variable in a subsection undergoing the transition to obtain approximation coefficients for as many levels as is necessary. The number of levels of decomposition is a user-defined parameter and typically takes a value of between 1 and 5. These wavelet coefficients are then compared with the wavelet coefficients for transitions available in the knowledge base. Since the previous mode is known, the comparison can be restricted to only those transitions that are known to occur from this mode. A norm of the difference between the wavelet coefficients is obtained at each level, and a sum of all these norms is computed. The transition that provides the least norm is flagged as the current transition if the value of the norm is smaller than a user defined parameter. If the value of the smallest norm is larger than this user defined parameter, than the transition is flagged as an unknown transition. This procedure is repeated for each subsection that is currently undergoing a transition. The similarity measure described above can be replaced with other similarity measures.

Based on the events identified for the subsections, the event for the sections is inferred by looking-up the event lookup table available in the knowledge base for each section. This procedure is carried out for all the sections by moving up the plant hierarchy.

Thus, the above-mentioned method identifies and tracks the process by identifying the current state—mode or transition.

The transition in a process consists of several phases as mentioned earlier. In addition to tracking the current state of the process, an additional method exists to track the process within the transition. This method takes as its inputs:

1. a knowledge of the common operating policies for the plant, commonly available in the form of standard operating procedure of the transition; and
2. the distinct features of the process variables during the transition.

The phases in the operation or the standard operating procedure is represented schematically using a Grafcet representation as shown by Viswanathan, S., Johnsson, S. C., Srinivasan, R., Venkatasubramanian, V. and Arzen, K. F., "Automating Operating Procedure Synthesis For Batch Processes: Part I.", Knowledge Representation And Planning Framework, Computers And Chemical Engineering, 22 (11), 1673–1685, 1998. The actions to be performed are represented by Grafcet steps, and the condition for the end of each task is represented using a Grafcet transition. For example, consider the startup of a distillation column, which consists of the following steps:

1. initially put all the controllers in manual;
2. open the cooling water to the condenser;
3. fill liquid of higher bottom product composition in the reboiler and start the reboiler heating, and operate the column in full reflux;
4. when the product starts collecting in the top and when the tray temperatures remain constant, start the feed pump and operate the column under constant reflux; and
5. when the column temperatures remain constant, then the column has reached steady state.

Figure 7:
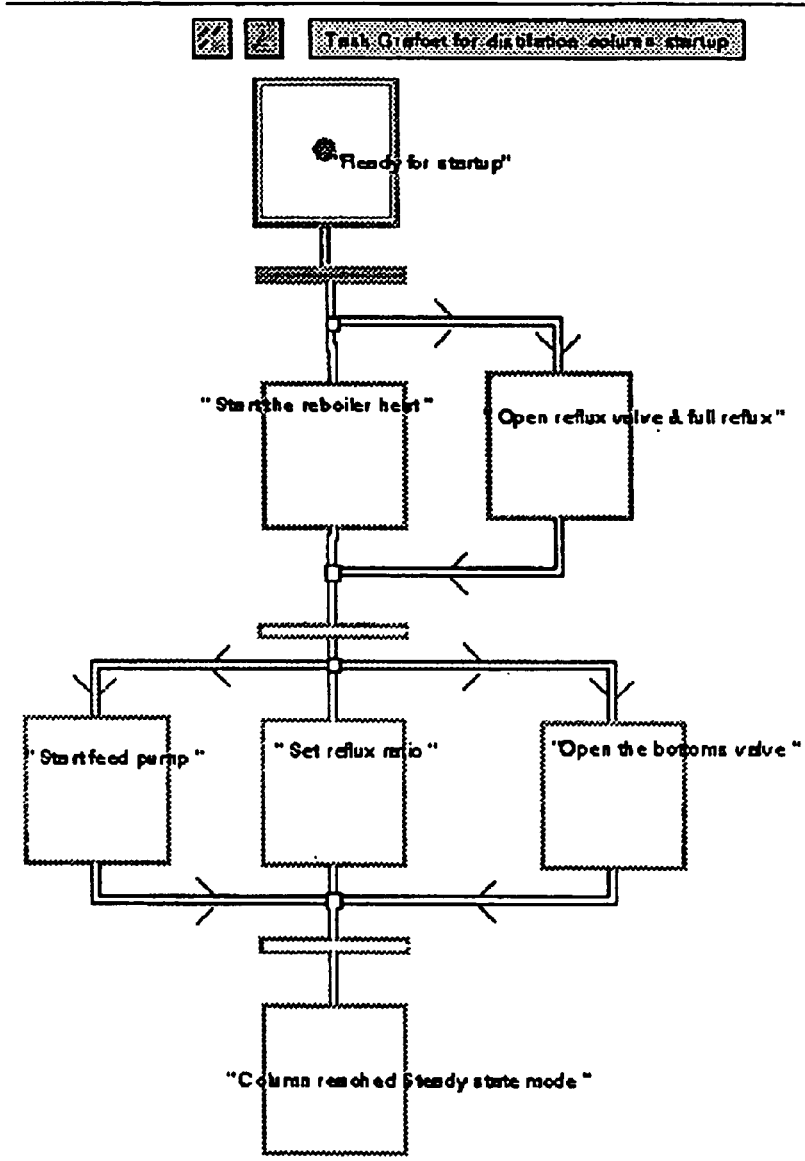
FIG. 7 shows the Grafcet representation for a startup procedure for a distillation column.

The Grafcet representation for this particular example is given in FIG. 7.

For the purpose of tracking and subsequent monitoring of transition, a subset of the distinct features of a process variable (including variable trend, duration of trend and variable value at the beginning and end of the trend) is termed an atom. The series of this atom for a process variable is termed the enhanced trend of that process variable. This information for every process variable during the current transition is obtained from the previously generated knowledge base and is termed as the dictionary of that variable. Portions of the enhanced trend corresponding to each phase in the operating procedure (represented by a Grafcet step) are stored corresponding to its Grafcet step. Thus, every atom in the dictionary has a corresponding Grafcet step to which it belongs.

The method for tracking the process within a transition continuously looks at the trend of the evolving process variable. The combination of variable trend, duration of trend, and variable value at the beginning and end of the trend for a real-time process variable is termed a real-time atom. The logic behind the tracking method is that, there could be minor deviations in the magnitude of the process variable and the start and end time of different phases, but the trend of the process variable should essentially follow the trend as given in the dictionary.

Figure 8:
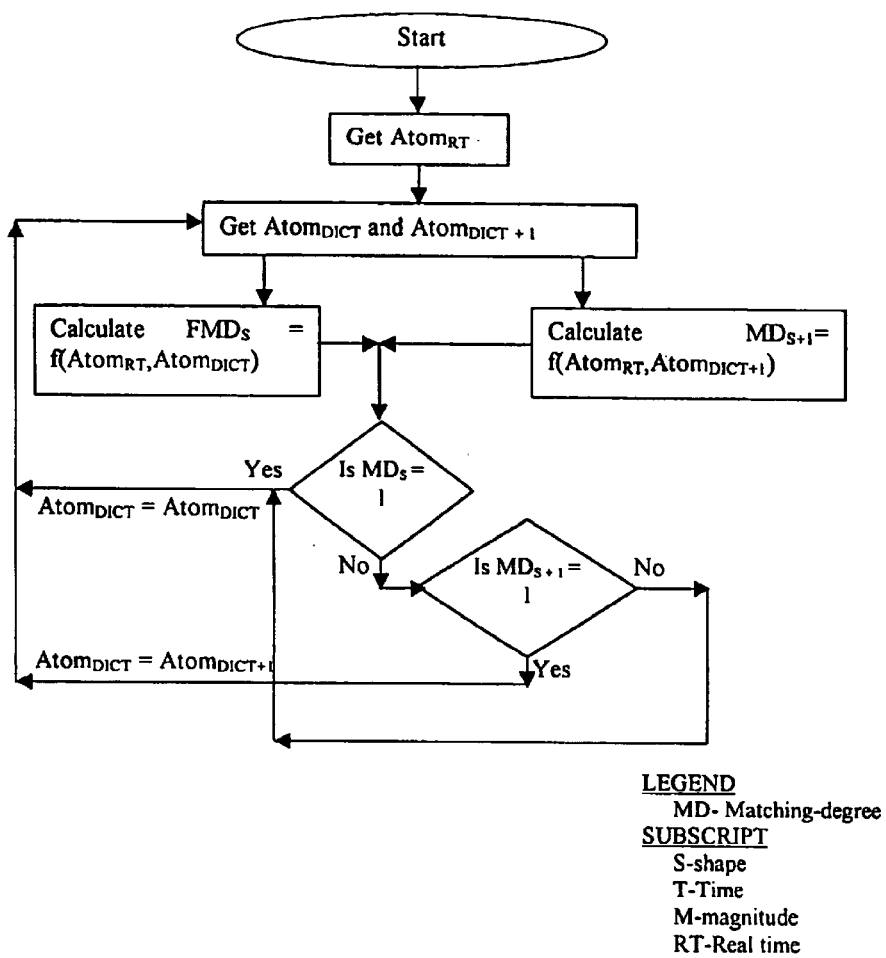
FIG. 8 shows the technique for comparing the different elements of an enhanced trend.

A dynamic feature synchronization algorithm for this tracking is shown in FIG. 8. As shown in FIG. 8, the algorithm starts with the first real-time atom. A comparison of trend is done with the first dictionary atom. Then for subsequent real-time atoms, the trend is compared with the current dictionary atom and the next one. If the trend of a real-time atom is equal to the next dictionary atom, then the comparison of the subsequent real-time atoms is done from there; otherwise, for the subsequent real-time atoms, trend is compared with the current dictionary atom. Thus, using this dynamic feature synchronization method, the dictionary atom to which the real-time atom corresponds is identified. Once the dictionary atom is identified, the corresponding phase in the operating procedure, currently being carried out in the plant, can be identified.

This information regarding the current phase of transition may be broadcast to different sections of the plant. This kind of tracking helps in context sensitive process operation and recovery in the case of any abnormality.

The dynamic feature synchronization algorithm described above can be replaced with other equivalent ones such as dynamic time warping. This tracking method is an optional method, which can be used if the process current operating phase needs to be identified for a process.

Figure 9:
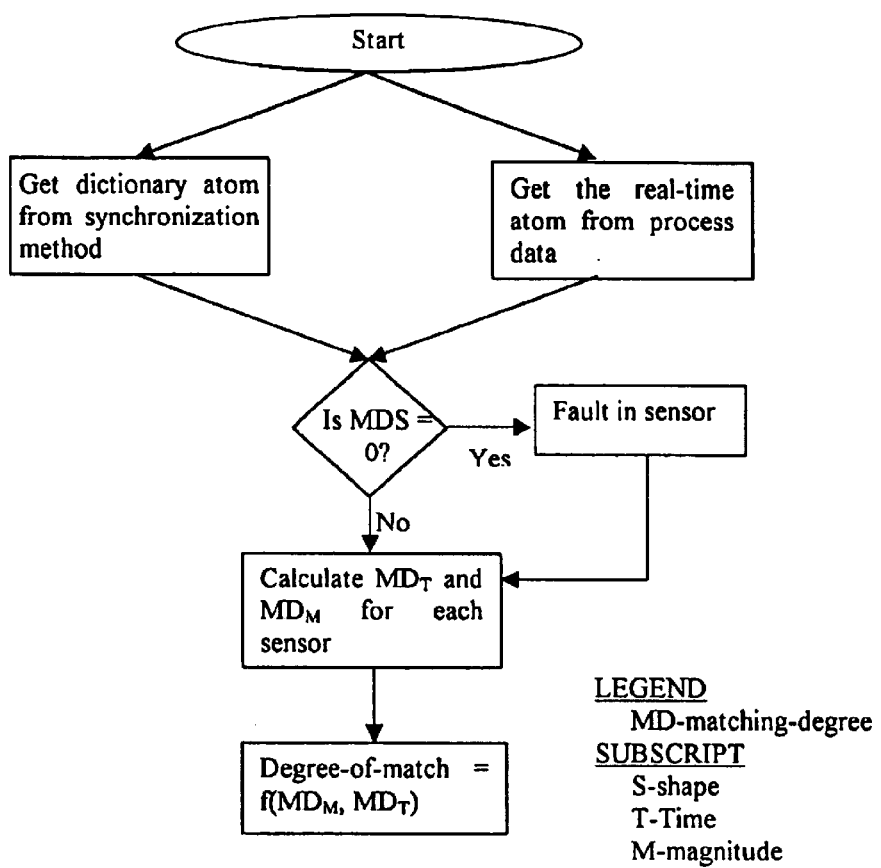
FIG. 9 shows a typical trend during different runs of a process transition.

Finally, there exists a method for monitoring processes during a transition. This method takes as input the enhanced trend of the process variables. This method is independent of the Grafcet representation for operating procedures. If the operating procedure information is made available, it may be used. This method essentially consists of a comparison of the different elements of the real-time enhanced trend with that of the dictionary as shown in FIG. 9. For this, the first step is the identification of the dictionary atom to be compared with. The dynamic feature synchronization algorithm discussed above provides this information of the dictionary atom. This tracking method identifies the corresponding dictionary atom for a real-time atom. If the Grafcet information is made available to the system, it additionally provides the phase being performed. As per the flow diagram shown in FIG. 9, first the trend between the real-time and the dictionary atom are compared. If there is a mismatch in trend, it is concluded that there is an abnormality in the process variable, otherwise the comparison proceeds. Then comparison is performed between the process variable magnitude and the trend duration between the real-time and dictionary atom. From this, the matching degree for each process variable is calculated. The degree of fault of the whole process is calculated as a function of degree of fault of individual sensors.

The monitoring method identifies any abnormality during the process transition and informs the operator regarding the same. The details of the sensor (the sensor type, tag name), kind of abnormality (deviation in shape or magnitude or time) and the extent of deviation from normalcy are reported to the operator. This will help the operator rectify and bring the process operation back to normal.

Identification of trend of the process variable is an important step since trend is considered as the main criterion for synchronizing the real-time process with the dictionary. Both the second-order and the first order trends discussed above can be used for this purpose. Using second-order trends allows for a fine comparison between real time trends and those in the knowledge base where even minor deviations can be detected quickly. On the other hand, the use of first-order trends provides a coarse comparison that is more robust to run-to-run deviations. The method allows for the user to select either the second order or the first order trend based on the how closely the real-time process is required to follow the dictionary.

What is claimed is:

1. A system for monitoring a complex process over a transition phase from a first mode, said system comprising:
   a database containing identifying data related to known modes and known transitions;
   a measurement device providing current process data related to said complex process;
   a comparator using said identifying data and said current process data so as to determine which one of said known modes and said known transitions that said complex process is currently within; and
   a range checking component using stored data of said one of said known modes and said known transitions as determined by said comparator, and using said current process as data so as to signal when said complex process is outside of an acceptable range.

2. A system according to claim 1 wherein said transition phase includes at least one changing process variable.

3. A system according to claim 1 wherein said mode includes all substantially constant variables.

4. A system according to claim 1 wherein said complex process comprises a second mode after said transition phase.

5. A system according to claim 1 wherein said identifying data related to said known modes and said known transitions is based on historical data.

6. A system according to claim 1 wherein said identifying data related to said known transitions are based on theoretical data.

7. A system according to claim 1 wherein said comparator is configurable to receive input from an operator to determine whether said complex process is currently within one of said known modes and said known transitions.

8. A system according to claim 1 wherein each of said known modes and said known transitions is subdivided into enhanced states, and further wherein said database contains identifying data related to each of said enhanced states of said known modes and said known transitions so as to determine which one of said enhanced states of said known modes and said known transitions that said complex process is currently within.

9. A system according to claim 8 wherein each of said enhanced states is subdivided into atoms, and further wherein said database contains identifying data related to each of said atoms of said enhanced states of said known modes and said known transitions so as to determine which one of said atoms of said enhanced states of said known modes and said known transitions that said complex process is currently within.

10. A system according to claim 1 wherein said identifying data of said comparator comprises mapped data.

11. A system according to claim 10 wherein at least a portion of said mapped data relates to said known transitions.

12. A system according to claim 10 wherein at least a portion of said mapped data relates to known modes.

13. A system according to claim 10 wherein at least a portion of said mapped data relates to an individual subsection of said known transitions.

14. A system according to claim 10 wherein at least a portion of said mapped data relates to an individual subsection of said known modes.

15. A system according to claim 1 wherein said identifying data related to said known transitions are based on experience-based data.

16. A method for monitoring a complex process over a transition phase from a first mode, said method comprising:
   providing a database containing identifying data related to known modes and known transitions;
   obtaining current process data related to said complex process;
   comparing said current process data with said identifying data so as to determine which one of said known modes and said known transitions that said complex process is currently within; and
   comparing said current data with stored data of said one of said known modes and said known transitions as determined by said comparator so as to signal when said complex process is outside of an acceptable range.

17. A method for supervising a complex process involving a client, said method comprising:
   identifying a state of said complex process, said state comprising one of at least one transition phase and at least one mode;
   reporting said identified state comprising said one of at least one transition phase and at least one mode to said client; and
   reconfiguring said client based on said identified state of state of said complex process.

18. A method for classifying a complex process into modes and transition phases, said method comprising:
   identifying values of given variables within a subsection of said complex process;
   determining the magnitude of variation of each of said values of said given variables over said subsection of said complex process; and
   classifying said subsection into one of said modes and said transition phases based on said magnitude of variation of each of said values of said given variables over said subsection of said complex process.

19. A method according to claim 18 wherein a section is classified in a mode when each of its subsections are classified in modes.

20. A method according to claim 18 wherein a section is classified in a transition when at least one of its subsections is classified in a transition phase.

21. A method of generating knowledge base for monitoring a complex process over a transition, said method comprising:

obtaining plant history data and plant hierarchy;

grouping plant tags into sections and subsections;

generating a process trend and a wavelet coefficient for each said plant tags;

generating process trends for each tag in every lower-level group;

identifying periods of constancy for each variable in each lower-level group using said generated process trends;

identifying modes for each lower-level group;

consolidating and characterizing modes for each lower-level group;

consolidating and characterizing transitions;

generating an event list for each lower-level group;

generating an event lookup table for higher-level groups; and generating said knowledge base.

22. A method for identifying a state of a complex process, said state comprising one of at least one transition phase and at least one mode, said method comprising:

providing tagged sensor data from said complex process;

segregating said tagged sensor data into plant sections and subsections of a plant hierarchy using a knowledge base;

analyzing the range of variables of each of said subsections using said knowledge base so as to determine which one of a transition phase with at least one of said variables outside of said pre-determined range and a mode with all of said variables within said pre-determined phase that said subsection is currently within;

identifying a current mode for each of said subsections in one of said modes based on values of said variables and said knowledge base;

identifying current transition phases for each of said subsections in one of said transition phases using wavelet-based feature comparison for key variables with said knowledge base; and deducing events in higher level plant groups using each of said current modes, current transitions, and said knowledge base.

23. A method for identifying a current transition phase of a complex process, said method comprising:

generating wavelet approximation coefficients for variables in a subsection in said current transition phase;

comparing said wavelet approximation coefficients of said current transition phase with corresponding wavelet coefficients for transitions available in a knowledge base; and identifying said current transition phase based on said comparison of said wavelet approximation coefficients of said current transition phase with said corresponding wavelet coefficient for transitions available in said knowledge base.

24. A method to track a complex process within transition phase, said method comprising:

providing distinct features of process variables of common operation data within a common transition phase;

measuring distinct features of process variables of said complex process within said transition phase; and comparing said distinct features of said process variables of said complex process within said transition phase and said distinct features of said process variables of said common operation data within said common transition phase so as to track said complex process.

25. A method for determining an enhanced trend for a series of one subset of distinct features of a process variable, said method comprising:

obtaining stored information related to said series of said one subset of said distinct features of said process variable;

obtaining current information related to said one subset of said distinct features of said process variable; and comparing said current information related to said one subset of said distinct features of said process variable and said stored information related to said series of said one subset of said distinct features of said process variable to one another so as to determine said enhanced trend for said series of said one subset of distinct features of said process variable.

26. A method for tracking a trend of a process variable against a stored trend as given in a dictionary, said method comprising:

comparing said trend of said process variable to a current dictionary atom and a subsequent dictionary atom;

identifying one of said current dictionary atom and said subsequent dictionary atom corresponding to said trend of said process variable; and broadcasting information related to current transition phase of said identified current dictionary atom to sections of a plant.

27. A method for monitoring a complex process during a transition phase, said method comprising:

measuring a real-time enhanced trend of process variables;

identifying a dictionary enhanced trend of said process variables;

comparing trends of each of said real-time enhanced trend and said dictionary enhanced trend to one another;

comparing process variable magnitudes of each of said real-time enhanced trend of said process variables and said dictionary enhanced trend to one another;

comparing trend durations of each of said real-time enhanced trend of said process variables and said dictionary enhanced trend to one another;

calculating a matching degree for each of said process variables from said trend comparison, said process variable magnitude comparison, and said trend duration comparison;

calculating a degree of fault of said complex process as a function of degree of fault of individual sensors; and informing an operator of said matching degree and said degree of fault.

28. A system for monitoring a complex process over a transition phase from a first mode, said system comprising:

a database containing identifying data related to known modes and known transitions;

a measurement device providing current process data related to said complex process;

a comparator using said identifying data and said current process data so as to determine which one of said known modes and said known transitions that said complex process is currently within; and a range checking component using stored data of said one of said known modes and said known transitions as determined by said comparator, and using said current process as data so as to signal when said complex process is outside of an acceptable range;

wherein each of said known modes and said known transitions is subdivided into enhanced states, and further wherein said database contains identifying data related to each of said enhanced states of said known modes and said known transitions so as to determine which one of said enhanced states of said known modes and said known transitions that said complex process is currently within.

29. A system for monitoring a complex process over a transition phase from a first mode, said system comprising:

a database containing identifying data related to known modes and known transitions;

a measurement device providing current process data related to said complex process;

a comparator using said identifying data and said current process data so as to determine which one of said known modes and said known transitions that said complex process is currently within; and a range checking component using stored data of said one of said known modes and said known transitions as determined by said comparator, and using said current process as data so as to signal when said complex process is outside of an acceptable range;

wherein each of said known modes and said known transitions is subdivided into enhanced states, and further wherein said database contains identifying data related to each of said enhanced states of said known modes and said known transitions so as to determine which one of said enhanced states of said known modes and said known transitions that said complex process is currently within; and wherein each of said enhanced states is subdivided into atoms, and further wherein said database contains identifying data related to each of said atoms of said enhanced states of said known modes and said known transitions so as to determine which one of said atoms of said enhanced states of said known modes and said known transitions that said complex process is currently within.

30. A system for monitoring a complex process over a transition phase from a first mode, said system comprising:

a database containing identifying data related to known modes and known transitions;

a measurement device providing current process data related to said complex process;

a comparator using said identifying data and said current process data so as to determine which one of said known modes and said known transitions that said complex process is currently within; and a range checking component using stored data of said one of said known modes and said known transitions as determined by said comparator, and using said current process as data so as to signal when said complex process is outside of an acceptable range;

wherein each of said known modes and said known transitions is subdivided into enhanced states, and further wherein said database contains identifying data related to each of said enhanced states of said known modes and said known transitions so as to determine which one of said enhanced states of said known modes and said known transitions that said complex process is currently within; and wherein at least a portion of said mapped data relates to an individual subsection of said known transitions.

31. A system for monitoring a complex process over a transition phase from a first mode, said system comprising:

a database containing identifying data related to known modes and known transitions;

a measurement device providing current process data related to said complex process;

a comparator using said identifying data and said current process data so as to determine which one of said known modes and said known transitions that said complex process is currently within; and a range checking component using stored data of said one of said known modes and said known transitions as determined by said comparator, and using said current process as data so as to signal when said complex process is outside of an acceptable range;

wherein each of said known modes and said known transitions is subdivided into enhanced states, and further wherein said database contains identifying data related to each of said enhanced states of said known modes and said known transitions so as to determine which one of said enhanced states of said known modes and said known transitions that said complex process is currently within; and wherein at least a portion of said mapped data relates to an individual subsection of said known modes.

* * * * *